Oct. 23, 1928.
W. RAWLEY
1,689,050
POLE SUPPORT
Filed Aug. 5, 1925     2 Sheets-Sheet 1
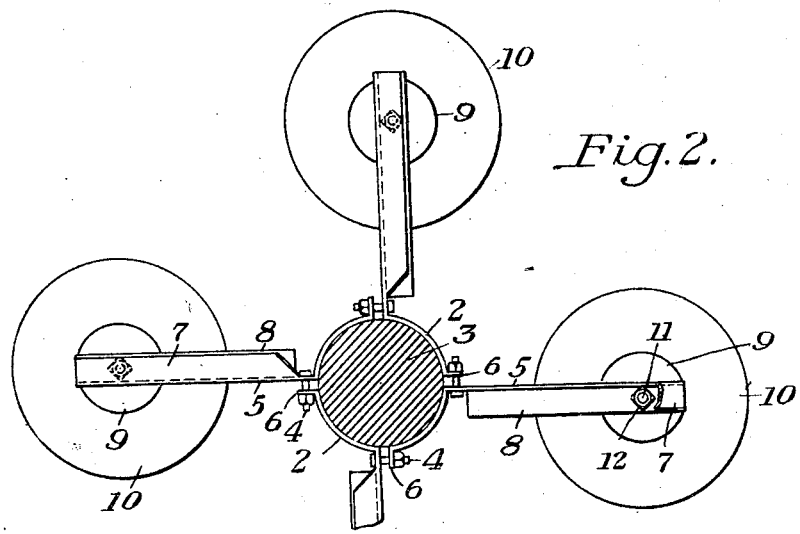
Fig.2.
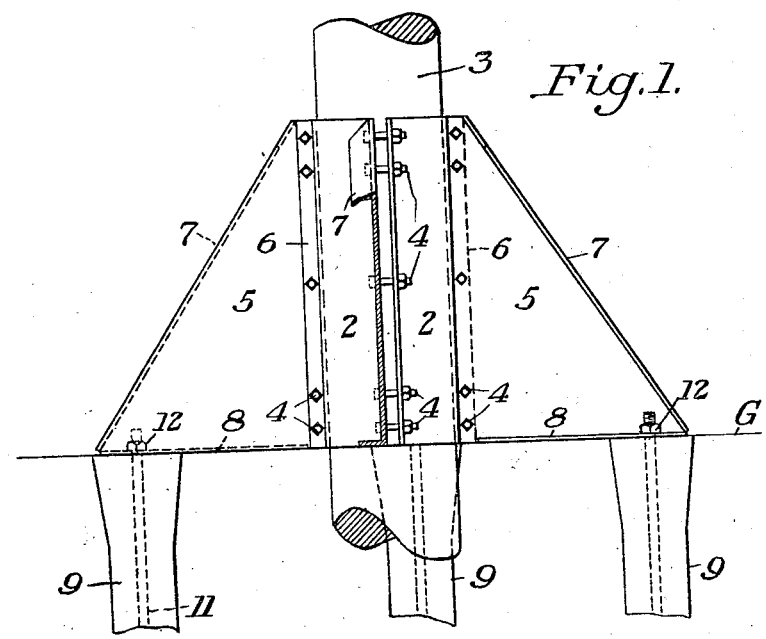
Fig.1.
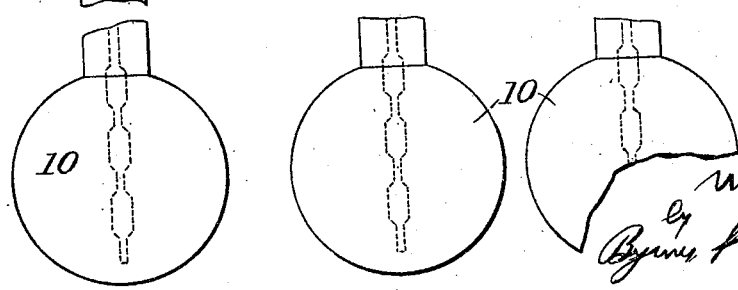
INVENTOR
Wayne Rawley,

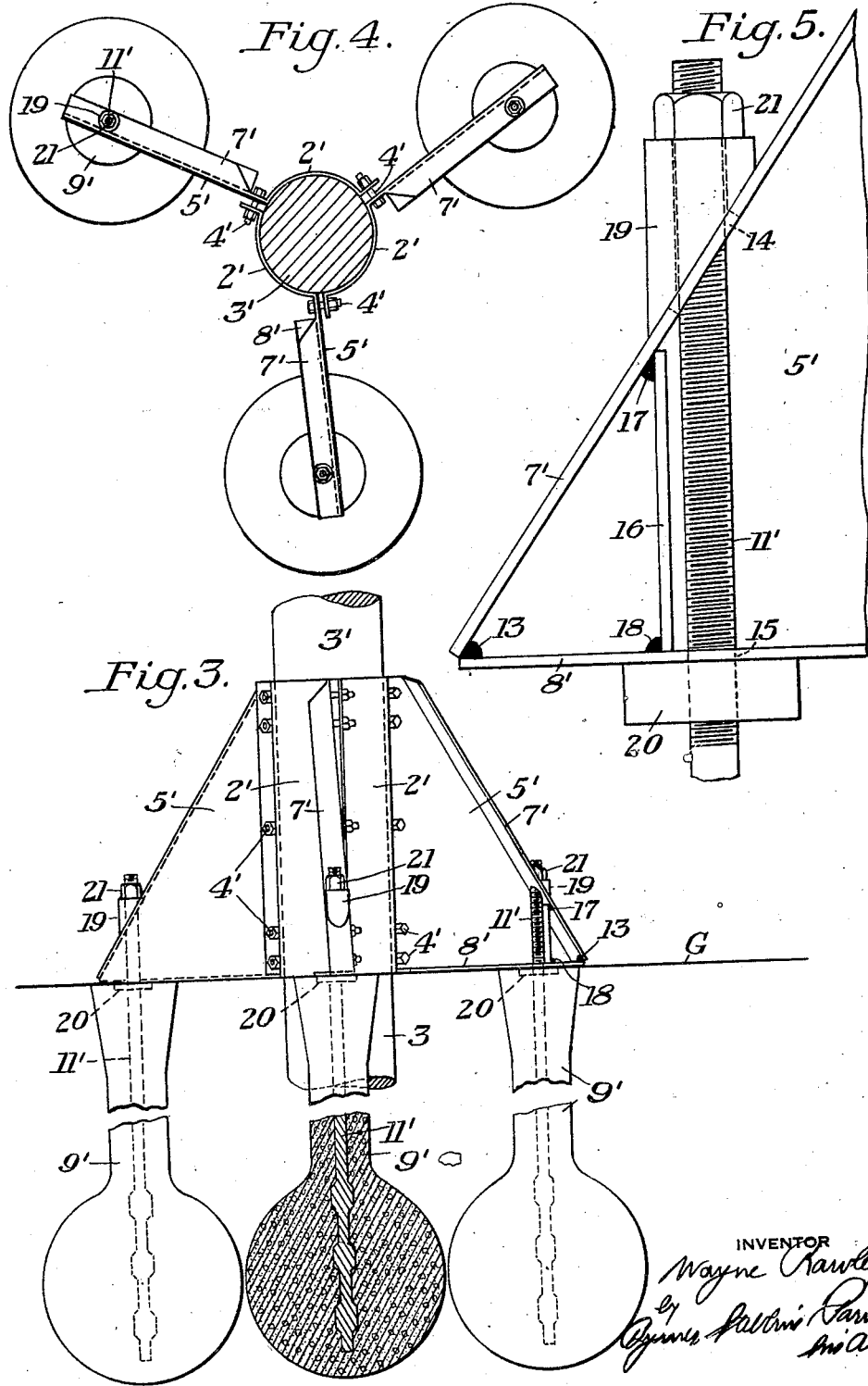

Patented Oct. 23, 1928.

1,689,050

UNITED STATES PATENT OFFICE.

WAYNE RAWLEY, OF PITTSBURGH, PENNSYLVANIA, ASSIGNOR TO BLAW-KNOX COMPANY, OF PITTSBURGH, PENNSYLVANIA, A CORPORATION OF NEW JERSEY.

POLE SUPPORT.

Application filed August 5, 1925. Serial No. 48,261.

The present invention relates to supports for poles, such as telegraph poles, and has for its object to provide a support adapted to be applied either to a pole which is rotting off at the ground line without having to disturb the portion in the ground, or to a new pole to support the latter without embedding it in the ground at all.

In the accompanying drawings—

Figure 1 is a side elevation of one form of support embodying my invention applied to a pole having its lower end buried in the ground, the pole in this view being shown broken away below the ground line and above the upper end of the sleeve;

Figure 2 is a sectional view through the pole looking down on the support, a portion of the latter being broken away;

Figure 3 is a view similar to Figure 1 of another form of my invention;

Figure 4 is a sectional view through the pole looking down on the support shown in Figure 3; and Figure 5 is a detail view of the construction shown in Figures 3 and 4.

Referring to the form of the invention shown in Figures 1 and 2, the support comprises a sleeve made up of four sections 2 which are curved in cross section and which are adapted to be clamped about the base of a pole 3, preferably immediately above the ground line G by means of bolts 4. Each section of the sleeve has a substantially triangular wing 5 integral with one edge thereof and extending radially outwardly from the pole. Each section also has a radially extending flange 6 integral with its other edge and the bolts 4 pass through the flanges 6 and the wings 5. The sections 2 and their integral wings are adapted to be bent to shape from suitable stiff sheet metal and each wing 5 preferably has a stiffening flange 7 along its inclined edge and a bearing flange 8 along its lower edge.

The flanges 8 are adapted to bear upon suitable anchors which may be embedded in the ground at points spaced from the pole in order that the portion of the pole projecting below the ground need not be disturbed in applying the support to the pole. I prefer to employ concrete anchors 9 having enlarged lower end portions 10. This type of anchor is of well known construction. Embedded in each anchor is a metal rod 11, the threaded upper end of which passes through an opening in the bearing flange 8 of a wing 5, and cooperating with the threaded upper end of such rod is a nut 12 which secures the wing to the anchor.

In the form of the invention shown in Figures 3, 4 and 5, the clamping sleeve is formed in three sections 2' which are fastened about the pole 3' by the bolts 4'. Each wing 5' has its flanges 7' and 8' connected by a weld 13 where these flanges meet at the corner of the wing. These flanges have aligned openings 14 and 15, and a vertical brace 16 extends between the flanges adjacent the openings and has its ends secured to the flanges by welds 17 and 18. The anchor rods 11' which are embedded in the concrete anchors 9' have their upper end portions extending through the openings 14 and 15 and projecting above the flanges 7'. The portion of each anchor rod which extends through these openings is screw threaded. The screw threaded portion of each anchor rod which extends above the upper flange 7' also extends through a hollow casting 19, having its lower end cut off on a bevel corresponding to the inclination of the flange 7' so that such beveled lower end of the casting can rest on said flange. A nut 20 engages the threaded portion of each anchor rod to bear against the lower face of the flange 8' and this nut is embedded in the upper end of the concrete anchor 9'. Another nut 21 engages the upper end of each anchor rod and is screwed down onto the upper end of the hollow casting 19. This hollow casting may be formed by cutting a piece of pipe off on a bevel.

Both forms of the invention illustrated are shown applied to a pole having its lower end portion buried in the ground. When a telegraph or a similar pole begins to rot away at its base, a support of this character can be applied to the pole without disturbing the portion of the pole projecting into the ground, and this support will restore to the pole the necessary strength to maintain it in upright position. As a matter of fact, the pole even though badly rotted away at the base, will be more firmly supported than originally. While the invention is particularly useful in this connection, it also may be employed for supporting new poles without embedding them in the ground.

While I have shown and described certain preferred embodiments of my invention, it will be understood that the invention is not limited to the details of construction shown but that it may be otherwise embodied within the scope of the appended claims without departing from the spirit of the invention.

I claim:

1. A pole support comprising a plurality of sleeve sections each having a vertical substantially radial wing projecting therefrom at one vertical edge thereof and having a flange projecting therefrom on the other vertical edge whereby the wing of one section is adjacent the flange of an adjacent section, and securing means passing through the respective wings and flanges.

2. A pole support, comprising a multi-part sleeve adapted to embrace the lower portion of a pole, each part of said sleeve having an integral substantially triangular wing extending outwardly therefrom and having flanged upper and lower edges provided with aligned openings for receiving an anchor rod, and a vertical brace extending between said flanges adjacent said openings, substantially as described.

In testimony whereof I have hereunto set my hand.

WAYNE RAWLEY.